J. B. OWENS.
REFRACTORY CONTAINER.
APPLICATION FILED JAN. 26, 1917.
1,286,747.
Patented Dec. 3, 1918.
2 SHEETS—SHEET 1.
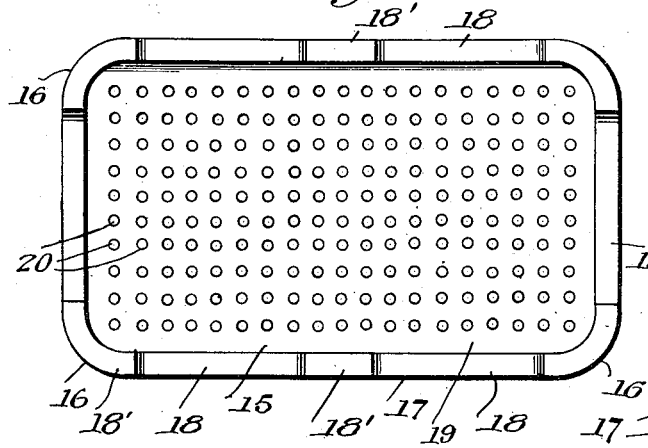
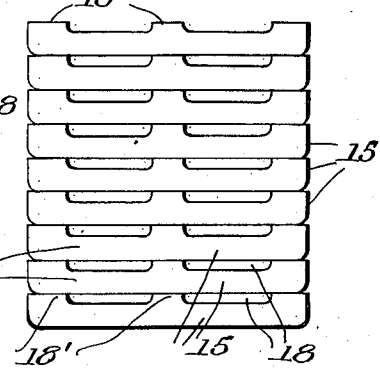
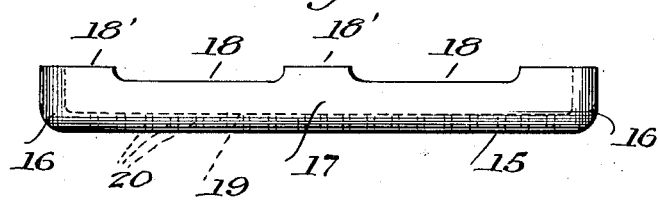
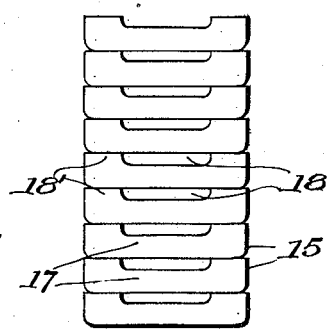
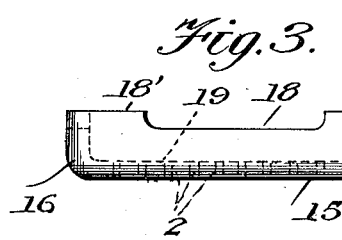
WITNESSES
INVENTOR
J. B. Owens
BY Victor J. Evans
ATTORNEY J. B. OWENS.
REFRACTORY CONTAINER.
APPLICATION FILED JAN. 26, 1917.
1,286,747.
Patented Dec. 3, 1918.
2 SHEETS—SHEET 2.
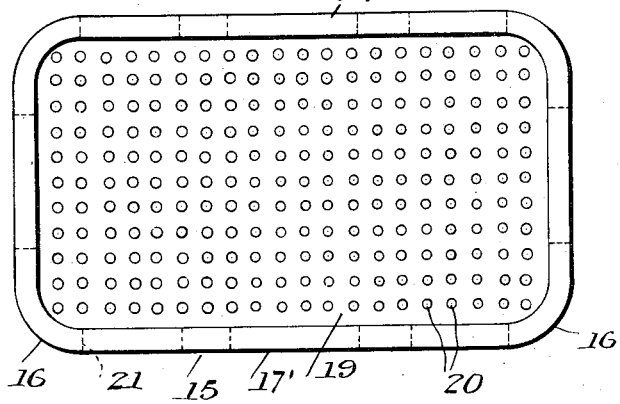
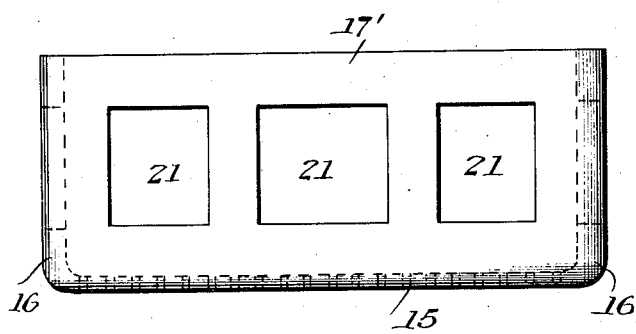
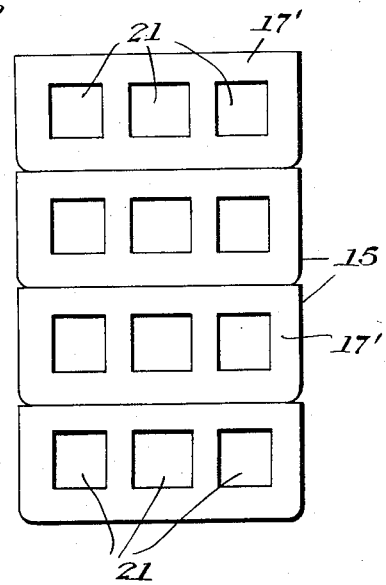
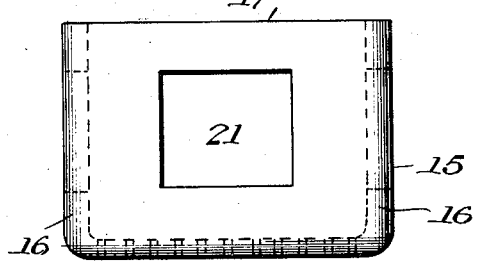
INVENTOR
J. B. Owens
BY Victor J. Evans
ATTORNEY
WITNESSES
H. S. Huggins
E. E. Young.

UNITED STATES PATENT OFFICE.

JOHN B. OWENS, OF METUCHEN, NEW JERSEY.

REFRACTORY CONTAINER.

1,286,747.   Specification of Letters Patent.   Patented Dec. 3, 1918.

Application filed January 26, 1917. Serial No. 144,707.

*To all whom it may concern:*

Be it known that I, JOHN B. OWENS, a citizen of the United States, residing at Metuchen, in the county of Middlesex and State of New Jersey, have invented new and useful Improvements in Refractory Containers, of which the following is a specification.

This invention relates to refractory containers for protecting tile, ceramic ware and the like while being exposed to the burning heat of the kiln.

The invention has for its object to improve the construction of the container so as to promote rapidity in burning the ware contained therein by providing for the uniform exposure to direct heat of all the material to be burned, no matter to what height the containers may be set in the kiln. Containers in present use and known as saggers employ solid walls which have to be penetrated by the heat before the material contained therein can be raised to the desired temperature. The heat which is absorbed by the sagger walls represents a loss of time and fuel, except when the nature of the material to be burned requires burning in a muffle, and the excessive weight of the solid saggers causes an additional loss of labor of handling, to say nothing of the cost of the additional material required to make the sagger.

A further object of the invention is to so construct a container that while the material contained therein will be exposed to the direct action of heat in all directions, the improved container may be safely piled in courses of any height and without danger of interference with or injury to the contents.

With these and other ends in view which will readily appear as the nature of the invention is better understood, the same consists in the improved construction and novel arrangement and combination of parts which will be hereinafter fully described and particularly pointed out in the claim.

In the accompanying drawings has been illustrated a simple and preferred form of the invention, it being, however, understood that no limitation is necessarily made to the precise structural details therein exhibited, but that changes, alterations, and modifications, within the scope of the appended claim may be resorted to when desired.

In the drawings:

Figure 1 is a plan view of a refractory container constructed in accordance with the invention.

Fig. 2 is a side elevation of the same.

Fig. 3 is an end elevation.

Fig. 4 is a view in side elevation showing a plurality of the improved containers stacked.

Fig. 5 is an end view of the same.

Fig. 6 is a plan view illustrating a modified form of the invention.

Fig. 7 is a side elevation of the same.

Fig. 8 is an end elevation.

Fig. 9 is a view inside elevation showing a number of the improved containers illustrated in Figs. 6, 7 and 8, stacked.

Corresponding parts of the several views are denoted by like characters of reference.

The container illustrated in Figs. 1 to 5, inclusive, is of shallow form and it consists of an approximately rectangular body 15 which may be provided with rounded edges and corners 16. By forming the containers with rounded edges and corners as shown it will be readily seen that the said containers may be stacked more easily and with less danger of bruising and crumbling any of the edge portions of said containers than where square corners and edges are employed, as is usually the case. The dust and fragments produced by bruising the edge portions of the containers is apt to settle on the ware that is to be fired, disfiguring the same and reducing the value thereof. The side walls 17 are provided with recesses 18 in the upper edges thereof, said recesses being formed in the sides and end portions of the side walls, leaving upstanding portions or lugs 18. The bottom portion 19 of the body is provided with numerous perforations 20 to permit free circulation of heat about the material contained in the container.

In the modified form illustrated in Figs. 6 to 9, inclusive, a container of greater depth has been shown. In this case the side walls here designated by 17' are provided with openings 21 of large area in order that the heat may freely circulate around the contents of the container. The top edges of the side and end wall portions are permitted to remain flat and level as shown.

When the containers illustrated in Figs. 1 to 5, inclusive, are stacked as seen in Figs. 4 and 5, the superposed containers will be supported on the lugs 18 of the subjacent ones, and the recesses 18 will constitute openings for the free circulation of heat. When constructed as shown in Figs. 6 to 9, inclusive, the superposed containers will rest on the top edges of the wall portions of the subjacent ones, and heat will be permitted to circulate through the openings 21. In both cases vertical circulation of heat is provided for by the bottom openings 20.

It will be understood from the foregoing description that material contained in the improved containers will be freely exposed to heat circulating laterally as well as vertically; it will also be readily understood that the contents is subjected to the direct action of heat instead of depending on the transmission of the heat through the solid walls of a sagger as heretofore practised. It follows that the time required for burning the ware will be much reduced and it has been found by practical experience that the results have been in every way highly satisfactory. It is evident that the shape or design of the container, the area and arrangement of the heat circulating openings, and other details may be varied indefinitely without departing from the spirit of the invention.

Having thus described the invention, what is claimed as new is:

A refractory container comprising an open topped rectangular box-like structure having its entire bottom wall provided with a plurality of relatively small perforations and having its side and end walls provided with spaced relatively large openings whereby an unrestricted circulation of heat in a vertical and horizontal direction will be permitted about objects placed in the container, said container being adapted to be placed upon and below other similar containers, the bottom of one serving as the top of the one next below.

In testimony whereof I affix my signature.

JOHN B. OWENS.